E. J. MILLER.
NAIL STRIP HOLDER.
APPLICATION FILED OCT. 18, 1920.
1,383,993.
Patented July 5, 1921.
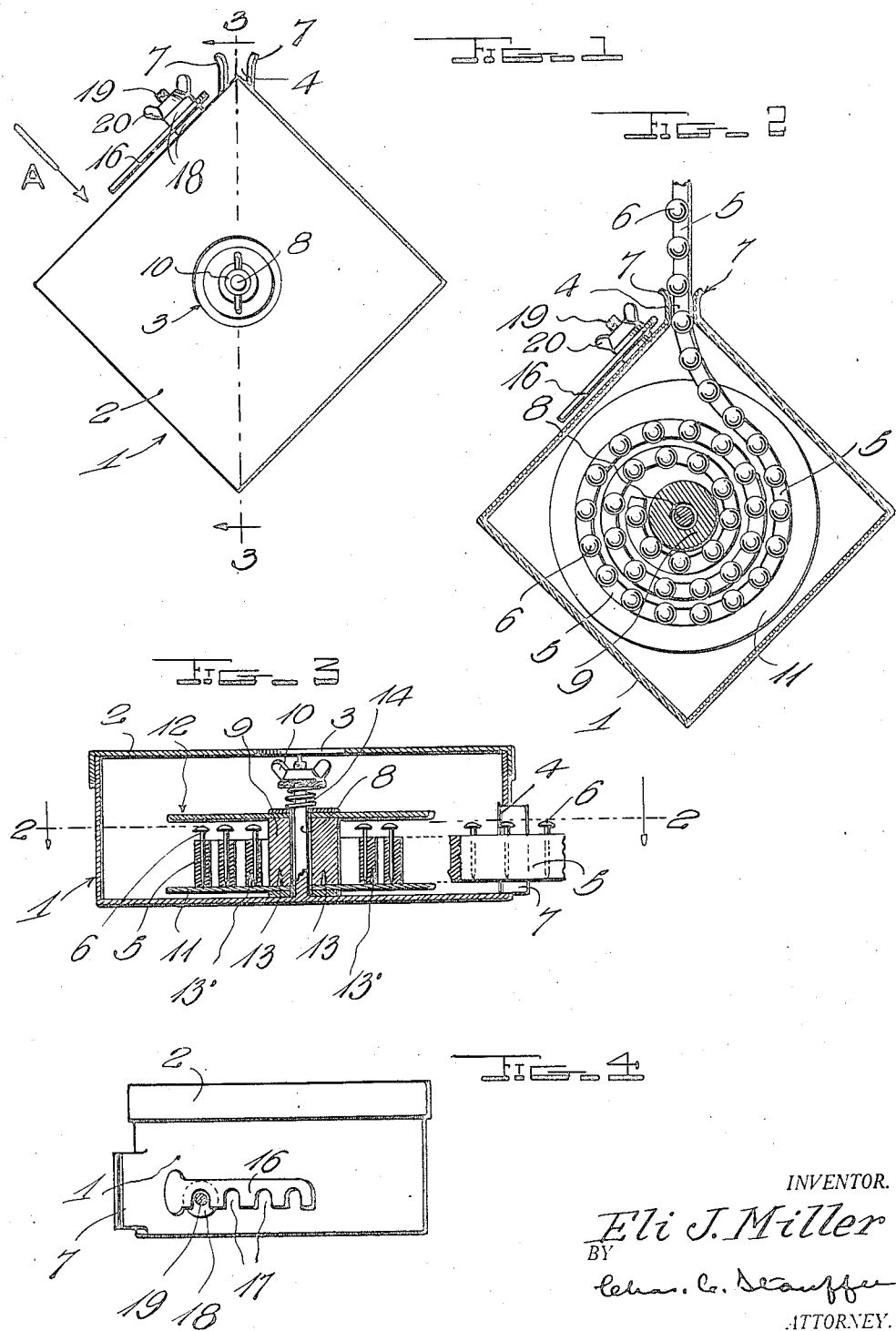
INVENTOR.
Eli J. Miller
BY
Chas. C. Stauffer
ATTORNEY.

UNITED STATES PATENT OFFICE.

ELI J. MILLER, OF YORK, PENNSYLVANIA.

NAIL-STRIP HOLDER.

1,383,993.  Specification of Letters Patent.  Patented July 5, 1921.

Application filed October 18, 1920. Serial No. 417,713.

*To all whom it may concern:*

Be it known that I, ELI J. MILLER, a citizen of the United States, residing at York, county of York, and State of Pennsylvania, have invented certain new and useful Improvements in Nail-Strip Holders; and I do hereby declare the following to be a full, clear, and exact description of the invention, such as will enable others skilled in the art to which it appertains to make and use the same.

My invention relates to a device for holding a nail-strip, particularly the nail-strip for which I have made application for patent in the United States of America on October 5, 1920, Serial No. 414,903. This strip, as that application discloses, contains nails regularly spaced and temporarily held in a strip of rubber or similar material, and these strips filled with nails, are used as guides for placing the nails for attaching soles, tap soles, and heels, etc. It is desirable to have a compact and convenient device for holding the strip while it is being fed to the sole of a shoe. My present device is one of this character.

By the attachment and employment of a gage and guide the nails are more regular and uniformly in line with the nail channel. This is much to be desired for a good finished job of workmanship. Therefore the guide and gage is a great help and aid, especially to the unskilled workman.

The gage and guide plate is adjustable and can be raised or lowered and is well adapted to accommodate thick or thin soles, when regulated, so as to limit any bearing on the upper of a shoe, thus preventing the nail box from being unduly raised; this should always bear on the surface of the sole in the act of nailing.

I have illustrated the device in the drawings accompanying this application, in which:

Figure 1 is a top view of my device;

Fig. 2 is a sectional view on line 2—2 of Fig. 3, with gage attached.

Fig. 3 is a section on the line 3—3 of Fig. 1; and

Fig. 4 is a side view showing the attachment of the sole gage.

I show a square box 1 to which is attached a top or lid 2 fitting down over it, and this top has a hole or opening 3 therein for a purpose to be presently explained. In one corner of this box I show a mouth or throat 4 from which passes the nail-strip 5 provided with the nails 6. The mouth may be provided with expansible lips 7 which may engage the strip 5 frictionally so as to impede its passage somewhat. The box may be of any other desired shape.

In the center of the box at the bottom 1 rigidly secure a spindle 8 extending somewhat higher than the strip or nails. This is the bolt or spindle upon which is mounted a spool 9 upon which is wound the strip 5 when the spool is inserted in the box. The end of this strip passes out through the mouth 4 in the manner hereinbefore mentioned. To secure the spool and its coiled strip 5 upon the spindle 8 I provide the latter with a thumb nut 10 at the top, and by removing this thumb nut the spool 9 can be placed in position and the thumb nut screwed home to hold it there.

In order to create a frictional and tensional relation between the spool and the spindle, in order to retard the unwinding of the strip somewhat, I provide two disks, one, 11, at the bottom and the other, 12, at the top of the spindle or spool. The bottom one, 11, is provided with projections 13 which are sufficient to engage the spool. This secures sufficiently the spool and the disk together. The projection 13 may be nails or tacks protruding through the bottom disk and engaging the spool to the disk, permanently. Additional or other tacks 13' are provided to engage the lower part of the inner end of the coiled strip so as to hold said end in place next to the spool. The top disk 12 is put on top of the spool beneath the thumb nut 10 and between the thumb nut and the disk I put a flat or coiled spring 14 so that the thumb nut 10 bears down upon the spring 14 and the disk 12, and there is a frictional relation established particularly between the slowly turning lower disk and spool and the bottom of the box and the fixed post or spindle 8 and thumb nut 10, sufficient for the purpose and capable of adjustment by means of the thumb nut. The upper disk may also have means to engage the spool.

The coiled strips are rolled and prepared in package form and allied with a hollow core the same width as of the nail strips of the desired thickness. These cores are of sufficient diameter and circumference to fit loosely over the spool, on the spindle. Adjacent to the spool are the several upturned nails or tacks provided as an anchor, for holding the core and nail strips in position on the spindle until the nail strips are depleted and used up. The core is then pulled out and a new batch of the coiled nail strips is provided for the next operation.

The operator, in using the device, grasps the box in his left hand with the thumb and guides the device toward him. He fixes the place for the first nail 6 either before he seizes the box or after with the forefinger of his left hand, and this fixes the starting point. As he draws the box toward him successive nails 6 are disclosed and he taps each one with his hammer until he has gone all around the sole. He then removes the rubber or other strip and drives the nails home with a succession of quick sharp blows. When necessary to recharge the box he removes the lid and upper disk and inserts another coil, pressing it down upon the tacks or projections 13′, where it is held to turn with the spool. But I reserve the right and use of other means of fastening or, anchoring the nail strips, in conjunction and control, under the present device, without material deviation from the main object or construction.

In the case of soles which are cut to size, a gage 16 may be used. This gage is provided with certain notches 17. These may be holes. This gage is mounted between two of a certain number of washers 18 and these are mounted upon a screw 19 secured to one of the walls of the box or holder, preferably that wall opposite the thumb of the left hand when the device is used; the nut 20 of this screws down upon the gage in frictional engagement with the washer. This gage extends down alongside the sole of the shoe and regulates the distance of the mouth or nail channel of the box from the edge of the sole, thus guiding the workman accurately and completely. The gage may be mounted at either recess 17, or may, if desired, be lifted off entirely. A thumb nut 20 on the screw 19 aids in securing the gage in place. If the gage is not used the thumb nut can be loosened and the gage removed or turned back.

It will be seen that I have made a very convenient holder for my strip of the before-mentioned application Serial No. 414,903. It will be very convenient for unskilled workmen, and can be used indefinitely as there is nothing in it to wear out. When a pair of shoes is to be soled a strip containing sufficient nails for the purpose and wound upon one of my spools is placed in the box and the end brought through the opening. The procedure is then as indicated above. Each coil may also be wound about its own spool.

In order to gain access to the thumb nut at the top of my spool, I may provide the opening 3 before referred to in the top of my lid.

Having thus described my invention, what I claim and desire to secure by Letters Patent of the United States is:

1. In a nail-strip holder, in combination, a box for holding a spool, a rigid spindle on which the spool may turn, a disk to which the spool may be attached about the lower end of the spindle, a disk and friction spring about the upper part of the spindle, there being a mouth where discharging of a strip wound on a spool may occur, and means about said mouth for directing the strip.

2. In a nail-strip holder, in combination, a box, a top for said box for inclosing a spool of nail-strip in the box, a spindle rigid with the box, and extending to the top, means whereby the spool may be permitted to turn about the spindle under friction control, there being a discharge opening for the strip in one side of the box, and a gage attached to said box to guide the workman in placing the nails of the strip.

3. In a nail-strip holder, in combination, a box, a lid, a spindle rising from the bottom and adapted to hold the spool of a coiled nail-strip, friction means between the spool and the spindle there being a mouth through which the end of the strip may be led, walls on the sides of said mouth to engage the sides of the nail-strip, and a gage, said nail-strip holder and gage being adapted to be held by the left hand and moved about the edges of soles and heels of boots and shoes.

4. In a nail-strip holder, in combination, a box, a lid, a spindle rising from the bottom of the box and adapted to hold the spool of a coiled nail-strip, friction means between the spool and the spindle there being a mouth through which the end of the strip may be led, and a gage on the side of the box in such relation to said mouth as to determine the proper position of the nails of the nail-strip.

5. In a nail-strip holder, in combination, a box, a screw-topped spindle rigid with the bottom of the box, and extending to the top, a thumb nut for the said spindle, disks on the top and bottom of the spindle, and a spring between the thumb nut and the upper disk whereby the pressure upon a spool upon the spindle may be regulated, there being a discharge opening in the box for the nail-strip as it is unwound from the spool.

6. In a nail-strip holder, in combination, a box, a screw-topped spindle rigid with the bottom of the box, a nut for the top of the spindle, a spring between the nut and the spool, and a disk below the spool, attached to the spool and rubbing against the bottom to check the rotation of the spool, and means for attaching said bottom disk to a coil of nail-strip.

In testimony whereof, I affix my signature.

ELI J. MILLER.